US007894515B2

(12) United States Patent
Kuijk et al.

(10) Patent No.: US 7,894,515 B2
(45) Date of Patent: Feb. 22, 2011

(54) LOW VOLTAGE MULTISTAGE ADAPTIVE EQUALIZER

(75) Inventors: Maarten Kuijk, Berchem-Antwerpen (BE); Xavier Maillard, Pepingen (BE)

(73) Assignees: Vrije Universiteit Brussel, Brussels (BE); Eqcologic NV, Neder-over-Heenbeek (BE)

( * ) Notice: Subject to any disclaimer, the term of this patent is extended or adjusted under 35 U.S.C. 154(b) by 1488 days.

(21) Appl. No.: 10/545,199

(22) PCT Filed: Feb. 13, 2004

(86) PCT No.: PCT/EP2004/001414

§ 371 (c)(1),
(2), (4) Date: Aug. 11, 2005

(87) PCT Pub. No.: WO2004/073274

PCT Pub. Date: Aug. 26, 2004

(65) Prior Publication Data

US 2006/0140262 A1     Jun. 29, 2006

(30) Foreign Application Priority Data

Feb. 14, 2003   (EP) .................................. 03447028

(51) Int. Cl.
*H03H 7/30*   (2006.01)
*H03K 5/159*  (2006.01)
(52) U.S. Cl. ....................................... 375/232; 375/231
(58) Field of Classification Search ................. 375/232, 375/319, 233, 229

See application file for complete search history.

(56) References Cited

U.S. PATENT DOCUMENTS

| 4,607,231 | A |   | 8/1986  | Nakayama |
|-----------|---|---|---------|----------|
| 5,305,351 | A | * | 4/1994  | Mizoguchi ................. 375/232 |
| 5,526,377 | A | * | 6/1996  | Yedid et al. ................ 375/229 |
| 5,764,695 | A |   | 6/1998  | Nagaraj et al. |
| 5,841,810 | A | * | 11/1998 | Wong et al. ................ 375/232 |
| 6,169,764 | B1|   | 1/2001  | Babenezhad |
| 7,599,426 | B2| * | 10/2009 | Despain ..................... 375/152 |
| 7,623,600 | B2| * | 11/2009 | Momtaz et al. ............ 375/345 |
| 2002/0034221 | A1 | * | 3/2002 | Webster ..................... 375/229 |
| 2007/0014344 | A1 | * | 1/2007 | Maangat et al. ............ 375/229 |

FOREIGN PATENT DOCUMENTS

EP     1 392 001 A1    2/2004
WO     00/38384        6/2000

\* cited by examiner

*Primary Examiner*—Chieh M Fan
*Assistant Examiner*—Qutbuddin Ghulamali
(74) *Attorney, Agent, or Firm*—Bacon & Thomas, PLLC (57) ABSTRACT

The present invention is related to an adaptive equalizer comprising multiple tuning circuits that generate tuning signals. Each tuning signal can typically induce higher frequency gain up to a limited level, e.g. +5 dB, at the upper data frequency for compensation of high frequency losses in the connected transmission channel. Several tuning signals can tune one adaptive amplifying compensation stage. In its adaptive amplifying compensation stage the tuning signal can generate through its tuning function, non-linear small-signal and large-signal transfer behavior. However, by limiting the amount of higher frequency gain to maximum +8 dB per tuning function, and by having only one tuning function active at a time the resulting deterministic fitter remains tolerable. Several adaptive amplifying compensation stages introducing non-linear effects in the compensation behavior and their tuning functions are disclosed. Especially at low power supply voltage the merits of the present invention become apparent.

23 Claims, 6 Drawing Sheets

Fig. 1

*Prior Art*

| Curve | k1i | k2i |
|-------|-----|-----|
| Cur1  | 0   | 0   |
| Cur2  | 0.5 | 0   |
| Cur3  | 1   | 0   |
| Cur4  | 1   | 0.5 |
| Cur5  | 1   | 1   |

LOW VOLTAGE MULTISTAGE ADAPTIVE EQUALIZER

FIELD OF THE INVENTION

The present invention relates to the field of data communication. More particularly, the present invention relates to a line equalizer and more specifically to an adaptive filter and how it is adjusted in order to compensate for the attenuation of signals transmitted over a communication or transmission channel.

TECHNICAL BACKGROUND

An equalizer in general compensates frequency depending losses that a signal experiences when passing through, a transmission channel. Transmission channels include a wire, a pair of wires, an optical fibre, the reading and writing channels of a storage device like a hard-disc. A pair of wires includes a twisted pair, a twinax coax or a differential transmission line on a printed circuit board.

Adaptive equalizers generally include an adaptable filter, a control loop and an output reconstruction unit.

Patent application EP-02447160, co-pending herewith, describes how to organise the control loop such that robust self-adaptation is achieved, independently from the transmit amplitude and the transmitted bit pattern. A feedback control signal is generated from the equalised output of an equalizer filter. Depending on whether the output signal has been under- or over-compensated, the feedback control signal increases or decreases, such that after a reasonable time the feedback control signal converges to a value where optimal compensation is reached. The control loop is formed by a first means for measuring a short-term-amplitude signal of the output signal, a second means for measuring a long-term-amplitude signal of the output signal and a comparator means for comparing the short-term-amplitude signal and the long-term-amplitude signal, and for determining the evolution of the feedback control signal.

U.S. Pat. No. 5,841,810 describes a way to arrange multiple adaptive filter stages in an adaptive filter. The plurality of filter stages have a common equalisation control signal that has a magnitude that corresponds to the communications path transfer function, with each adaptive filter stage transfer function being an approximate inverse of a transfer function that corresponds to a portion of the input data signal communications path. The compensation thus is based on the ideal transfer function of the communication path. Further, a method of making multiple control signals using Zener-diodes is taught. This method has the disadvantage that it cannot be used with a standard CMOS or BICMOS circuit technology.

US patent application US-2002/0034221 discloses a communications receiver that has multiple stages each having a transfer function $1+K_i[f_i(j\phi)]$, wherein the $K_i$ vary with a sequential gain control methodology. US-2002/0034221 thus teaches compensation by making a sum per stage of the unity input signal linearly added to a function that has higher frequency gain. This known method makes multiple tuning signals in circuitry using many comparators and is relative complex, but is not suited for low voltage operation nor for implementation on a small chip area using small transistors that have large input offset mismatches.

A difficulty with the present state-of-the-art of adaptive equalizers is that it is being taught to make a transfer function of the equalizer filter correspond to an approximate inverse of a transfer function corresponding to a portion of the input data signal communications path. In that way, only very good filter types can be implemented. Similarly, in the state-of-the-art on adaptive filters, as e.g. in U.S. Pat. No. 5,841,810, serially connected cascaded adaptive filter sections or filter stages are used that each generate an approximate inverse of a transfer function of a portion of the input data signal communications path.

In that way, adaptive filters and filter sections require the use of near to perfect tuneable filters. This has a consequence that only a very small number of tuneable filters types can be implemented. These filter types typically further require a power supply voltage that is larger than 2V.

AIM OF THE INVENTION

The present invention aims to provide a novel adaptive filter and filtering method for use in an adaptive equalizer which provides an optimised equalisation of data signals transmitted over a communication channel, and more in particular to compensate for the attenuation of said signals, more specifically of the higher frequency components of said signals.

SUMMARY OF THE INVENTION

The present invention discloses how to deal with non-ideal, non-linear and non-perfect small signal and large signal transfer of adaptive amplifying compensation stages at a receiver side of a data communication network.

The present invention provides an adaptive equalizer having an adaptive filter, for at least partly compensating for frequency dependent signal modifications introduced by a transmission channel. The adaptive filter comprises a plurality of adaptive amplification compensation stages, each compensation stage being provided for receiving at least one tuning parameter. Each of the tuning parameters is such that it has one of a first binary value, a second binary value, or an intermediate value, whereby a tuning parameter with a binary value generates a first signal filtering behaviour and a tuning parameter with an intermediate value generates a second signal filtering behaviour. The second signal filtering behaviour is a non-linear signal filtering behaviour. With non-linear signal filtering behaviour it is meant that the quality of the filtering behaviour depends on the signal input, and that the filtering behaviour is not a mere linear combination of inverse functions of the ideal transfer functions of the transmission channel. In other words, the amount in which ideal compensation is obtained depends on the signal input.

In an adaptive equalizer according to the present invention, each of the compensation stages may furthermore comprise at least one element, wherein by turning on this element, a high frequency amplification means becomes active in the at least one compensation stage. By partially turning on the at least one element in at least one compensation stage, the at least one compensation stage may have a filtering behaviour depending on the signal amplitude. The element may be a transistor having a non-linear resistive value that is signal amplitude dependent leading to the non-linear filtering behaviour. Alternatively, the element may be a capacitor having a non linear capacitor value, that is signal amplitude dependent, leading to the nonlinear filtering behaviour.

Each of the adaptive amplification compensation stages may provide part of the signal filtering behaviour of the adaptive filter. Each of the adaptive amplification compensation stages may have a limited compensation level, e.g. a compensation level of 8 dB or less, preferably 5 dB or less.

In the adaptive equalizer according to the present invention, the at least partly compensating for frequency dependent signal modifications introduced by a transmission channel may show at least partly linear filtering behaviour, wherein the at least partly linear filtering behaviour may be at least 50% ideal filtering behaviour, preferably at least 66% ideal filtering behaviour, more preferably at least 75% ideal filtering behaviour. With ideal filtering behaviour it is meant that the compensation substantially is the inverse of the ideal transfer function of the communication path.

In one aspect of the adaptive equalizer according to the present invention, two or more tuning parameters may be used per adaptive amplification compensation stage.

In the adaptive equalizer according to the present invention, the linear filtering behaviour of the adaptive amplification compensation stages, receiving tuning parameters all having a binary value, may be compensating substantially ideally for the signal losses in a part of the transmission line.

An adaptive equalizer according to the present invention may furthermore comprise a control circuit for controlling the tuning parameters.

Such control circuit may comprise, for a tuning parameter, a memory element for storing a value for that tuning parameter. The memory element may be a capacitive element such as a capacitor or a transistor connected as a capacitor.

The control circuit may also comprise, for a tuning parameter, a determining means for determining whether it is allowed for the tuning parameter to become a tuning parameter with an intermediate value. The determining means may comprise at least one input port for receiving a first tuning parameter value from a first determining means, and at least one output port for outputting a tuning parameter value to a second determining means.

In the adaptive equalizer of the present invention, the amount of compensation obtained by tuning one tuning parameter is preferably limited to 8 dB, more preferably limited to 5 dB. An adaptive equalizer according to the present invention may be such that no two tuning parameters of the adaptive filter have an intermediate value at a same moment in time. The adaptive amplification compensation stage receiving that tuning parameter having an intermediate value, need not completely compensate the signal loss of a portion of the transmission channel.

The adaptive equalizer of the present invention may be able to operate at a voltage below 2000 mV, preferably below 1000 mV.

The present invention also provides an adaptive equalizer having an adaptive filter for at least partly compensating for frequency dependent signal modifications introduced by a transmission channel. The adaptive filter is provided for receiving at least two tuning parameters having a tuning effect on the signal filtering behaviour of the adaptive filter. The tuning parameters are such that they have any of a first and second binary value, or an intermediate value. Tuning parameters with a binary value generate a first signal filtering behaviour of the adaptive filter, and a tuning parameter with an intermediate value generates a second filtering behaviour of the adaptive filter, the second filtering behaviour being non-linear and thus less ideal than the first filtering behaviour for compensation of the modifications introduced by the channel. Non-linear means that the quality of the filtering behaviour depends on the signal input and the filtering behaviour is not a mere linear combination of inverse functions of the ideal transfer functions of part of the transmission channel. In other words, the amount in which ideal compensation is obtained depends on the signal input.

An adaptive amplification compensation stage where all tuning parameters have a first binary value, may generate a first signal filtering behaviour that compensates the signal loss of a portion of the transmission channel, i.e. provides an ideal compensation for the signal loss of a portion of the transmission channel. An adaptive amplification compensation stage which receives a tuning parameter with an intermediate value may generates a second signal filtering behaviour that is not completely compensating the signal loss of a portion of the transmission channel, i.e. such adaptive amplification compensation stage provides a non-linear compensation for the signal loss of a portion of the transmission channel. With non-linear it is meant that the quality, i.e. the degree of completeness, of the compensation depends on the input signal.

The present invention also provides a method for adaptively equalising a distorted signal from a transmission channel. The present invention provides a method for adaptively equalizing at least part of a distorted signal from a transmission channel, comprising filtering the distorted signal in an adaptive filter which comprises a plurality of adaptive amplification compensation stages whereby each compensation stage is provided for receiving at least one tuning parameter. The method also comprises driving the tuning parameters so as to have one of a first binary value, a second binary value or an intermediate value, whereby a tuning parameter with a binary value generating a first signal filtering behaviour and a tuning parameter with an intermediate value generating a second signal filtering behavior, being non-linear signal filtering behaviour. With non-linear it is meant that the quality, i.e. the degree of completeness, of the compensation depends on the input signal and thus is not the same for all input signals.

The method for adaptively equalizing according to the present invention may comprise controlling an adaptive amplification compensation stage with at least two tuning parameters ($K1i$, $K2i$). In the method, no two tuning parameters of the adaptive filter may be driven so as to have an intermediate value at a same moment in time. The method also may comprise driving such that one tuning parameter provides partial compensation limited to 8 dB, preferably limited to 5 dB.

The method comprises filtering the distorted signal in an adaptive filter with a first signal filtering behaviour for compensating for frequency dependent signal modifications introduced by the transmission channel. The filtering is controlled by a plurality of tuning parameters having a tuning effect on the first signal filtering behaviour of the adaptive filter. The method furthermore comprises driving the tuning parameters so as to have any of a first and a second binary value, or an intermediate value. Tuning parameters with a binary value generate a second signal filtering behaviour of the adaptive filter, and a tuning parameter with an intermediate value generates a third signal filtering behaviour of the adaptive filter.

An adaptive amplification compensation stage controlled by all tuning parameters having a first binary value, may compensate substantially ideally for the signal modification of a portion of the transmission channel; i.e. it provides an ideal compensation. An adaptive amplification compensation stage controlled by a tuning parameter having an intermediate value does not compensate completely for the signal modification of a corresponding portion of the transmission signal; i.e. it provides a non-ideal compensation. This non-ideal compensation is not a compensation based on a mere linear combination of inverse functions of ideal transfer functions of part of the communication path. The non-ideal compensation, also called non-linear compensation, is a compensation whereby the quality or the degree of compensating is depending on the signal input.

The not complete or non-ideal, i.e. non linear, compensation may be due to non-linear effects in the adaptive amplification compensation stage. The not complete or non-ideal, i.e. non linear, compensation may also be due to the presence of a maximum in a compensation transfer function of the adaptive amplification compensation stage, the maximum being below an upper data frequency of the signal.

In a method according to the present invention, the plurality of tuning parameters may be sequentially applied to the adaptive filter.

According to the present invention, it is shown that imperfect and non-linear transfer functions can still be used for adaptive equalizers which have good performance. A simple and robust way for generating multiple tuning signals is disclosed.

By keeping the maximum tuneable compensation range per tuning signal sufficiently low, preferably, although not necessarily, at about 5 dB, the resulting jitter of imperfect signal transfer can be kept within tolerable levels. For tuning signals that have any binary value, e.g. ZERO or ONE, its associated tuning function in its adaptive amplifying compensation stage is designed such that it essentially will not generate imperfections on the small and large signal transfer function. By sequentially turning the tuning signals ON, only one stage will generate imperfections at a time, such that the total effect on the full adaptive filter shows only limited imperfection, generating tolerable jitter.

Some special adaptive amplifying compensation stages are disclosed based on these considerations.

According to the present invention, low-voltage operation of equalizer circuits can be implemented. With low voltage, it is understood, a voltage supply level that is so low that it would make it difficult, if not impossible, to make adaptable filters according to the prior art, which always give an approximate inverse of a portion of a connected transmission channel. In small feature size CMOS technology operating at e.g. a 1200 mV power supply voltage, equalizer circuits operating at 10 Gbit/s can now become feasible due to the findings of the present invention, having power consumption of the order of only a few mW.

Further, according to the present invention, CMOS varactors are described that allow in certain cases to make adaptable filter stages not requiring an poly-poly capacitor or an MIM (metal insulator metal) capacitor module for a given CMOS technology. This lowers the cost.

The present invention, thus allows to use filters with filter stages having a non-linear behaviour, i.e. whereby the value of the compensation is depending on the signal amplitude or in other words filters that can be tuned, such that they do not provide ideal compensation of part of the transmission channel. Therefore it is possible to use filters that operate at low voltage and low power, such that use can be made of high quality transistors in CMOS technologies having a typical feature size of about 130 nm, 90 nm and smaller. These high quality transistors operate only at typical voltages of about 1.8V, 1V and smaller. Using these transistors allows to make a high speed equalizer. This allows the equalizer of the current invention to be used in the emerging CMOS markets, using chips that work at higher speeds and lower voltage.

These and other characteristics, features and advantages of the present invention will become apparent from the following detailed description, taken in conjunction with the accompanying drawings, which illustrate, by way of example, the principles for the invention. This description is given for the sake of example only, without limiting the scope of the invention. The reference figures quoted below refer to the attached drawings.

In the different drawings, the same reference figures refer to the same or analogous elements.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes the dimensions and the relative dimensions do not correspond to actual reductions to practice of the invention.

It is to be noticed that the term "comprising", used in the claims, should not be interpreted as being restricted to the means listed thereafter. Thus, the scope of the expression "a device comprising means A and B" should not be limited to devices consisting only of components A and B. It means that with respect to the present invention, the only relevant components of the device are A and B.

Similarly, it is to be noticed that the term "coupled" should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The invention will be described by a detailed description of several embodiments of the invention. It is obvious that other embodiments of the invention can be configured according to the knowledge of persons skilled in the art without departing form the true spirit or technical teaching of the invention, the invention being limited only by the terms of the appended claims. It will be clear for a person skilled in the art that the present invention is also applicable to similar circuits that can be configured in any transistor technology, including for example, but not limited thereto, CMOS, BICMOS and SiGe BICMOS. Also wilt it be clear that similar merits of the invention can be obtained when single ended signals are implemented as differential signals and vice-versa, without departing from the true spirit of the invention.

Figure 1:
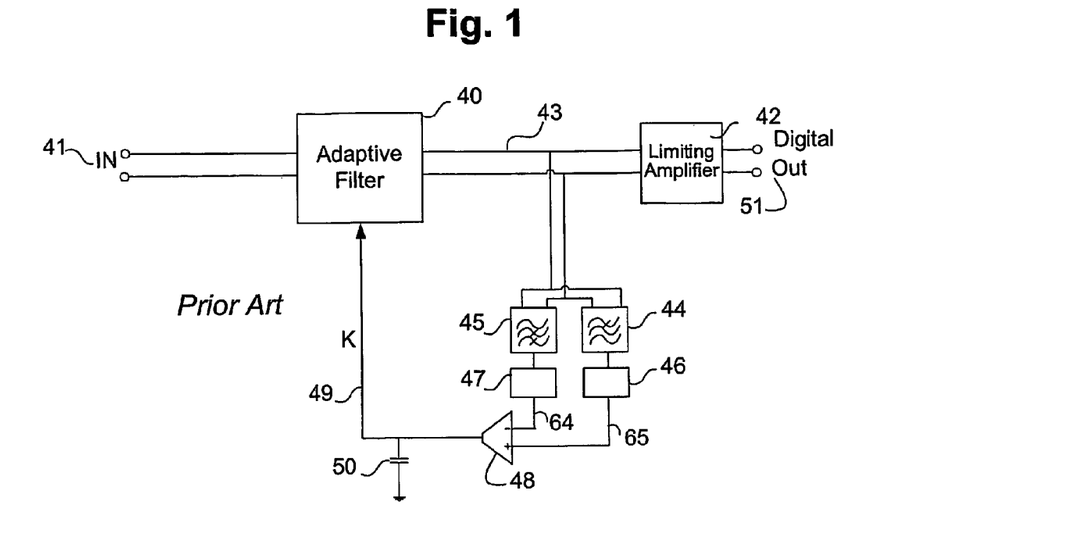
FIG. 1 shows a state-of-the-art adaptive equalizer.

FIG. 1 shows a prior art solution for a control loop of an adaptive filter 40, as described in EP-02447160. A signal that has been transmitted through a dispersive communication channel and is attenuated in some of its frequency components, especially its higher frequency components, enters the equalizer on node 41 being its data input. The system described is self-adaptive, i.e. based on the equalized signal at an output 43 of an adaptive filter 40 of the equalizer, it is determined by filters 44 and 45 and their connected peak detectors 46 and 47 and a comparator 48, whether a tuning signal K, fed to the adaptive filter 40 via node 49, should go up or should go down. This tuning signal K is stored on a memory element, e.g. a capacitor 50. Typically, when the tuning signal K goes up, the adaptive filter 40 is driven such that it compensates more for high frequency losses, thus increasing the amount of higher frequency gain. When the amplitude of the higher frequency signals at node 43 is at a too high level with respect to the amplitude of the lower frequency signals at the same node 43, this will be determined by the feedback circuit formed by filters 44 and 45, peak detectors 46 and 47 and comparator 48. K will be decreased, and the adaptive filter 40 will correspondingly decrease the higher frequency gain. A limiting amplifier 42 is provided at the output 43 of the adaptive filter 40, for example for clipping the output signal and converting it to a digital signal 51.

Most known solutions have one element in common: a comparator or Operational Transconductance Amplifier (OTA) 48 that drives a memory element, e.g. a capacitor 50. The voltage on the memory element, e.g. capacitor 50, is then the signal that tunes the adaptive filter 40.

Figure 2:
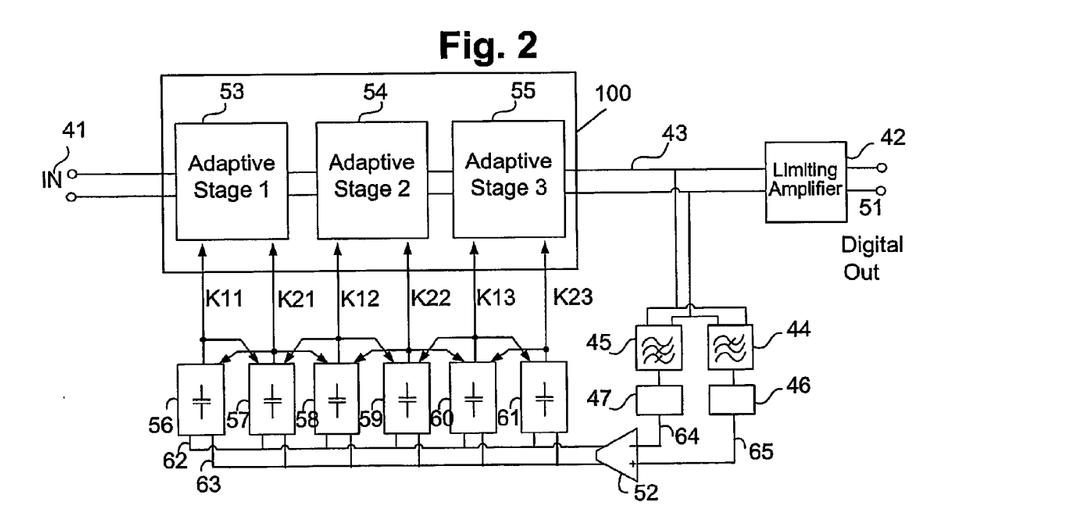
FIG. 2 illustrates an adaptive equalizer according to an embodiment of the present invention, comprising an adaptive filter with three adaptive amplifying compensation stages each tuned by two tuning signals, that are turned ON sequentially by tuning circuits following a neighbour triggering method.

FIG. 2 shows a first embodiment of an adaptive equalizer according to the present invention. Such equalizer may be provided at the receiver side of a transmission or communication channel, and may be used for example in, but not limited to, communication over coax, twisted pair and printed circuit board backplane interconnects. A transmission channel or communication channel may for example include a twisted pair, a coax-cable, a printed circuit board transmission line, including both differential signalling and single ended signalling methods. Attenuation of higher frequency components in the transmission channel can be due to several attenuation mechanisms, including for example, but not limited thereto, metal skin-effect, dielectric losses and first order attenuation including parasitic capacitances and/or inductances at printed circuit board via's and connectors.

A signal transmitted through the communication channel enters the equalizer on node 41 being its data input.

The adaptive filter function of the equalizer, carried out by an adaptive filter 100 is split into several adaptive amplifying compensation stages 53, 54, 55 which are coupled in series in cascade. The number of these adaptive amplifying compensation stages 53, 54, 55 depends on the wanted or required total compensation to be reached, and can differ from application to application. This number also depends on the used circuit integration technology. In applications where the transmission channel length may vary, the equalisation must be capable of adapting to variations in the cable length. Therefore, each adaptive amplifying compensation stage 53, 54, 55 equalises the data signal for a length of the transmission channel (up to a predetermined maximum) via which the data signal was received. Preferably, although not necessarily, each adaptive amplifying compensation stage 53, 54, 55 provides similar equalisation or compensation for an equal predetermined maximum length of transmission channel. For example, for a transmission channel length of between 2 L and 3 L, the first two adaptive amplifying compensation stages 53, 54 may provide equal successive amounts of equalisation, with the third adaptive amplifying compensation stage 55 providing a non-ideal amount of equalisation for the remaining cable length between 2 L and 3 L. This means that compensation is not performed by making a mere linear combination of the maximum compensation performed in each stage, whereby the non-ideal amount of equalisation for the tuned stage would be providing a fraction of the maximum compensation performed for that stage, but that the non-ideal amount of equalisation is a non-linear signal compensation, i.e. a non-linear signal filtering behaviour having a compensation behaviour that depends on the signal input, i.e. the compensation is non-linear due to non-linear effects in an element of the compensation stage. This non-linear behaviour, caused by non-linear effects of elements in the adaptive compensation stages, will be described for the different embodiments of the present invention. In other words, it is not a mere linear adding of compensation with linear combinations of the ideal inverse transfer functions for part of the communication path.

Each of the adaptive amplifying compensation stages 53, 54, 55 are driven or controlled by one or more tuning signals K11, K21, K12, K22, K13, K23, in such a way that each tuning signal $K_{ji}$ has only a limited effect on the amount of compensation that it can generate. Each tuning signal K11, K21, K12, K22, K13, K23 can deliver e.g. maximally 8 dB (preferably maximally 5 dB) of compensation in the transfer function of its adaptive amplifying compensation stage 53, 54, 55. Tuning circuits 56, 57, 58, 59, 60, 61 organise how the tuning signals $K_{ji}$ are turned ON sequentially following a neighbour triggering method, as explained below. In the present invention, it is proposed that at any moment preferably maximally one tuning signal from the set of tuning signals $K_{ji}$ is at an intermediate tuning level, whilst the remaining tuning signals are at either one of two binary states, for example either at a ZERO-level, or at the ONE-level. In other words, the tuning signals are either ON or OFF, thus generating filter stages with a transfer function which is an ideal inverse of the transfer function of parts of the transmission channel, except for one tuning signal that can be at an intermediate level, thus generating a filter stage with a transfer function which is non-ideal inverse of the transfer function of a part of the transmission channel. The latter means that the compensation for the tuned filter stage does not correspond with a fraction of the compensation according to the ideal inverse of the transfer function, but that the compensation for the tuned filter stage has a different frequency dependency and is dependent of the signal input. This is illustrated in the different embodiments.

FIGS. 3a, 4, 5 and 6 illustrate a several embodiments of adaptive amplifying compensation stages 53, 54, 55 according to the present invention.

Figure 3A:
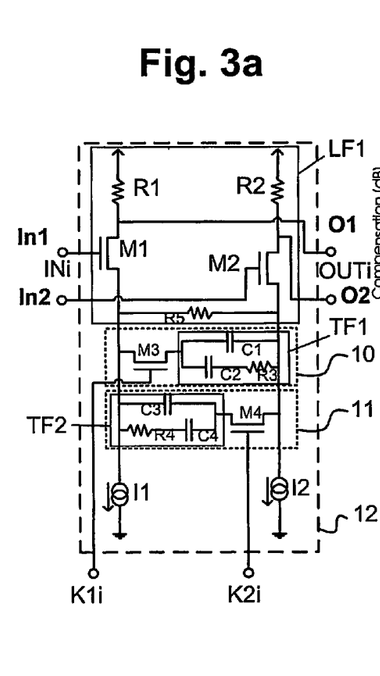
FIG. 3a illustrates an embodiment of an adaptive amplifying compensation stage having two tuning signals K1$i$ and K2$i$.

In FIG. 3a, a differential adaptive amplifying compensation stage 12 is shown, corresponding to the adaptive amplifying compensation stages 53, 54, 55 of FIG. 2. The compensation stage 12 receives an input signal Ini between a first input terminal In1 and a second input terminal In2, and generates an output signal OUTi between a first output terminal O1 and a second output terminal O2. The compensation stage 12 comprises a low frequency (LF) amplification means LF1 and a plurality of high frequency (HF) amplification means 10, 11.

As LF amplification means LF1, a differential pair is provided, comprising a first transistor M1 and a second transistor M2, the gate of the first transistor M1 being connected to the first input terminal In1 and the gate of the second input transistor M2 being connected to the second input terminal In2. The source of the first transistor M1 is coupled to a first current source I1, and the source of the second transistor M2 is coupled to a second current source I2. The drain of the first transistor M1 is coupled to the positive power supply Vcc over a first resistor R1. The drain of the second transistor M2 is coupled to the positive power supply Vcc over a second resistor R2. The drain of the first transistor M1 is connected to the first output terminal O1 and the drain of the second transistor M2 is connected to the second output terminal O2. The source of the first transistor M1 and the source of the second transistor M2 are coupled to each other over a third resistor R5. As known in the state of the art, the ratio between the first resistor R1 (preferably equal to the second resistor R2) and the third resistor R5 determines the DC amplification of the differential pair.

For amplification of the higher frequencies, the compensation stage 12 comprises a number of high frequency (HF) amplification means. In the example given in FIG. 3a, the compensation stage 12 comprises a first HF amplification means 10 and a second HF amplification means 11. Each of the number of HF amplification means 10, 11 is connected to and controlled or steered by (voltage) tuning signals K1i, K2i.

The first HF amplification means 10 in the embodiment of FIG. 3a comprises a first transfer function generating circuit TF1 coupled in series with a first switch M3, this series coupling itself being coupled between the sources of the first and second transistors M1, M2 of the differential pair. The second HF amplification means 11 comprises a second transfer function generating circuit TF2 coupled in series with a second switch M4, this series coupling itself also being coupled between the sources of the first and second transistors M1, M2 of the differential pair. The first and second switches are each controlled by a tuning signal K1i, K2i respectively.

The first and second switches may e.g. be formed by transistors M3 and M4 respectively, the tuning signals K1i, K2i being applied to the gates of these transistors M3, M4.

The transfer function generating circuits TF1, TF2 comprise elements that provide poles and zeros in the transfer function of the filter. For example the first transfer function generating circuit TF1 in the example of FIG. 3a comprises a first and a second capacitor C1, C2 and a fourth resistor R3. The second capacitor C2 is series coupled to the fourth resistor R3, and this series coupling is coupled in parallel to the first capacitor C1. The second transfer function generating circuit TF2 in the example of FIG. 3a comprises a third and a fourth capacitor C3, C4 and a fifth resistor R4. The fourth capacitor C4 is series coupled to the fifth resistor R4, and this series coupling is coupled in parallel to the third capacitor C3.

First to fourth capacitors C1 . . . C4 and fourth and fifth resistors R3 and R4 are designed such that when tuning signals K1i and K2i are turned ON, typically by bringing its voltage to Vcc (K1i=1 and K2i=1), the transfer function of the compensation stage 12, approximates the inverse of the portion of the transmission channel that one wants to compensate. First and third capacitors C1, C3 each bring in a pole in the transfer function when their respective switches M3, M4 are made conductive; in the example given, the transistors M3, M4 may be turned ON. The combination of the second capacitor C2 and the fourth resistor R3 gives a pole-zero addition when the first switch M3 is turned ON (switch being conductive), and similarly the combination of the fourth capacitor C4 and the fifth resistor R4 gives a pole-zero addition, when the second switch M4 is turned ON (switch being conductive).

The first and second high frequency amplifying means 10, 11 can be made more complex by adding in more elements, depending on the application. With making the first and second switches conducting, in case of transistors as in the example given above, i.e. by turning ON transistors M3 and M4 completely, it is understood to bring the gate voltages to the highest voltage available in the given circuit. In most cases, the power supply voltage Vcc is the highest available voltage.

Figure 3B:
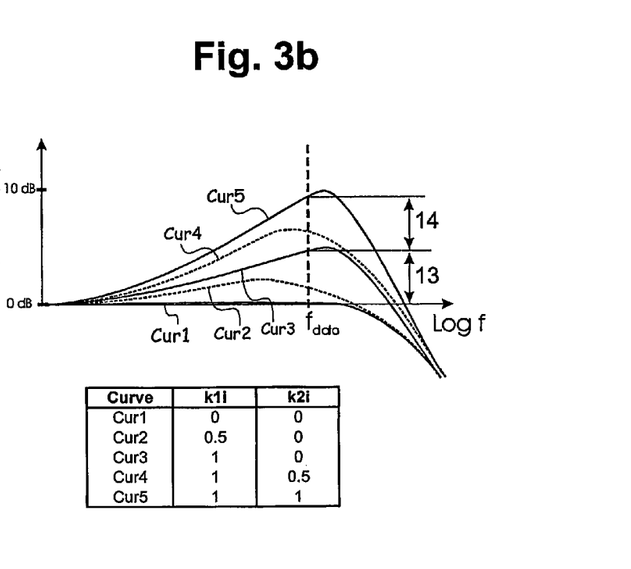
FIG. 3b illustrates the influence of the tuning signals K1$i$ and K2$i$ on the small-signal transfer function of the compensation stage.

In FIG. 3b, curves are shown which illustrate, in function of the frequency, the compensation (in dB) applied by the circuit of FIG. 3a. The curves Cur1 . . . Cur5 show the effects for variations of the tuning signal values K1i and K2i, as indicated in the table presented with FIG. 3b. Hereby also intermediate values for these tuning signals are considered. As is known by a person skilled in the art, the indicated upper data frequency $f_{data}$ is typical half of the communication bit rate in case of NRZ (non return to zero) signalling. For example, a 10 Gbit/s data NRZ-signal corresponds to an upper data frequency $f_{data}$ of 5 GHz. The upper data frequency for other types of communication, including PAM-4 communication, can be determined by any person skilled in the art.

Curve Cur1 (K1i=K2i=0, and thus the first and second switch M3, M4 being non-conductive) shows 0-dB amplification over the whole frequency range from DC up to the upper data frequency $f_{data}$.

When only the first BF amplification means 10 is turned ON (K1i=1, or the voltage on this node equals Vcc, and K2i=0), then curve Cur3 can be made to correspond to the inverse of a length-portion of the targeted transmission channel by implementing the right components in the first HF amplification means 10.

When, however, the tuning signal K1i equals an intermediate value, e.g. 0.5 (the voltage on the node being e.g. halfway the power supply voltage Vcc) then the transfer function obtained by the compensation stage 12 becomes far from ideal, as illustrated by Cur2. This is due to the fact that the first switch M3, in the example given a transistor, demonstrates resistive behaviour with too large resistance value to obtain a good transfer function. In other words, the poles and zeros of the transfer function are shifted excessively. The transfer function is no longer monotonically rising up to the upper data frequency $f_{data}$ since it shows a maximum just below $f_{data}$. It is to be noted that the frequency dependency is different from the frequency dependency which would be obtained if the compensation would be performed by merely taking a fraction of the compensation transfer function of the stage. Another problem is that in an equalizer, one doesn't wish to have only small signals, and that the data signal amplitude becomes so large, that the first switch M3, in the example given a transistor, cannot be considered to be a linear resistor when being turned on halfway. This is further more likely when moreover operating at a lower power supply voltage, e.g. of 1200 mV. This causes non-linear effects starting to dominate as well. These non-linear effects increase the amount of deterministic jitter. When switch M3, in the example given a transistor, is fully turned on (i.e. $K1i=1$), these non-linear effects can in most cases be designed to be sufficiently low and tolerable.

Similar things happen when the first tuning signal $K1i$ is in a first binary state suitable for switching on the first HF amplification means 10, and the second tuning signal $K2i$ is in an intermediate state. This is shown in FIG. 3b, Cur4 for $K1i=1$ and $K2i=0.5$.

From first order calculations and simulations however, these aforementioned imperfections unexpectedly still allow good operation of the total equalizer, as long as each tuning signal Kji has a limited range 13 of compensation on the transfer function. A good value of maximum compensation is 8 dB or less per tuning signal Kji, preferably 5 dB or less. When in the case of 5 dB maximum compensation per tuning signal Kji, for example 18 dB has to be compensated, three tuning signals can be at a first binary value, e.g. ONE, suitable for switching on the corresponding high frequency amplification means, one tuning signal can be at an intermediate value suitable for turning the corresponding switching means in a state between fully conductive and not conductive at all, and the remaining tuning signals are set to a second binary value, e.g. ZERO, suitable for switching off the corresponding high frequency amplification means. The three tuning signals that are at the first binary value, e.g. ONE, and the tuning signals that are at the second binary value, e.g. ZERO, lead to good transfer behaviour of the adaptive filter in total. Only the tuning signal with its intermediate value will lead to limited non-perfectness in the small signal transfer function and to limited non-linearity effects in the large signal transfer. By keeping the maximum compensation range 13 smaller than 8 dB, preferably smaller than 5 dB, the additional jitter caused becomes tolerable. Accepting this limited non-perfectness and thus the limited non-linearity effects in the large signal transfer allows use of filters for operation at low voltage.

When the available bandwidth in a given technology and for a certain application allows amplifying much more than the proposed 5 dB range in a single stage, then, several tuning parameters per adaptive amplifying compensation stage can be implemented. In FIG. 3a this is achieved with the second HF amplification means 11, that can be turned ON by making the second tuning signal $K2i$ high and making the second switch M4 conductive. Its limited compensation range 14 is also indicated in FIG. 3b. One adaptive amplifying compensation stage 12 can thus have several tuning signals $K1i$, $K2i$ that can be turned ON, one after the other. There is no limit in the number of tuning signals Kji per compensation stage 12. If an adaptive amplifying compensation stage 12 can compensate for 20 dB, the optimal number of tuning signals Kji would be 4 or 5. If a total compensation of 30 dB is envisaged, and if one has amplification stages 12 allowing 10 dB of amplification, it is advised to use three amplification stages 12, each having two tuning signals $K1i$, $K2i$ as represented in FIG. 2.

Another way to tune an adaptive amplifying compensation stage in its higher frequency compensation is by using varactor capacitors according to a second embodiment of the present invention. With MOS transistor technology, a varactor or variable capacitance can be made (under the gate of a transistor, with the gate being one varactor terminal) in three ways: by inversion, by accumulation and by depletion.

In FIG. 4a, again an adaptive amplifying compensation stage 21 is provided, comprising a LF amplifying means LF1 and a HF amplifying means 20. The LF amplifying means LF1 is as in FIG. 3a and is not described here again.

Figure 4A:
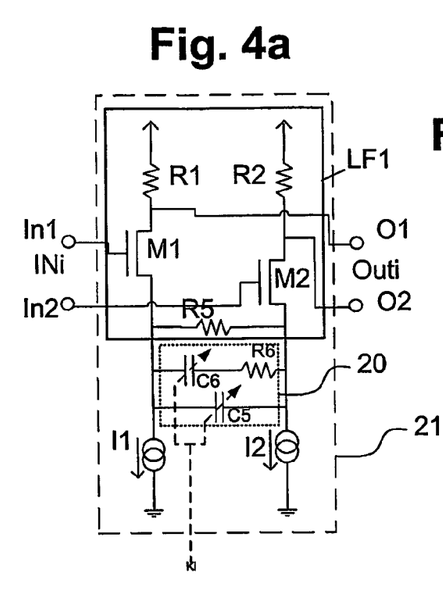
FIG. 4a illustrates an embodiment of an adaptive amplifying compensation stage having one tuning signal, whereby MOS varactors in the tuning function influence the transfer function of the stage and generate variable higher frequency gain.

The HF amplification means 20 comprises, in the example of FIG. 4, a first and a second varactor C5, C6 and a sixth resistor R6. The second varactor C6 and the sixth resistor R6 are coupled in series, and the first varactor C5 is coupled in parallel to this series-coupled circuit. The capacitance values of first and second varactors C5, C6 are determined by the tuning signal Ki corresponding to the HF amplification means 20. Both the first and the second varactor C5, C6 are simultaneously tuned.

Figure 4B:
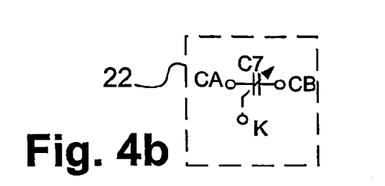
FIG. 4b illustrates a varactor.

In FIG. 4b, a varactor 22 is represented, comprising a variable capacitance C7 and three terminals CA, CB and K.

Figure 4C:
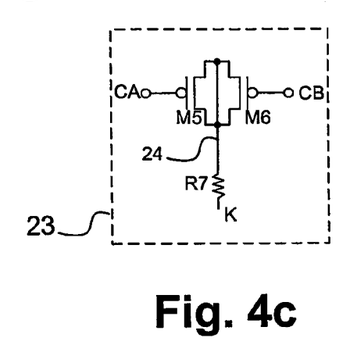
FIG. 4c illustrates a varactor obtained by inversion.

In FIG. 4c, an implementation is shown in case the varactor 23 is obtained by inversion. This implementation shows the source and drain of two PMOS transistors M5, M6 that are all connected together, and the two gates forming the terminals CA, CB of the varactor 23. The voltage on node 24 influences the capacitance value. Resistor R7 allows node 24 to freely oscillate, at least at higher frequencies. When the voltage at terminal K is Vcc, and when the voltages at nodes CA and CB are below Vcc-Vt, then transistors M5 and M6 have channels filled with carriers, and a high capacitance is obtained. When the voltage at terminal K is low, the channels of transistors M5 and M6 are not filled with carriers, and the capacitance between terminals CA and CB will be relatively low.

Other types of MOS varactors are known in the state of the art and similar anti-series connections can be considered. The advantage of all these MOS capacitors is that it allows to make equalizers that don't require a poly-poly or metal-metal (MIM capacitor module making the production cheaper. The varactors will behave highly non-linear when the tuning signal is in certain ranges between ZERO and ONE. This means that the quality of the compensation, i.e. the degree of completely compensating for frequency dependent signal modifications introduced by a transmission channel, will be dependent on the signal input. Again, by limiting the maximum compensation per tuning signal, the added jitter to the output is tolerable.

Figure 5:
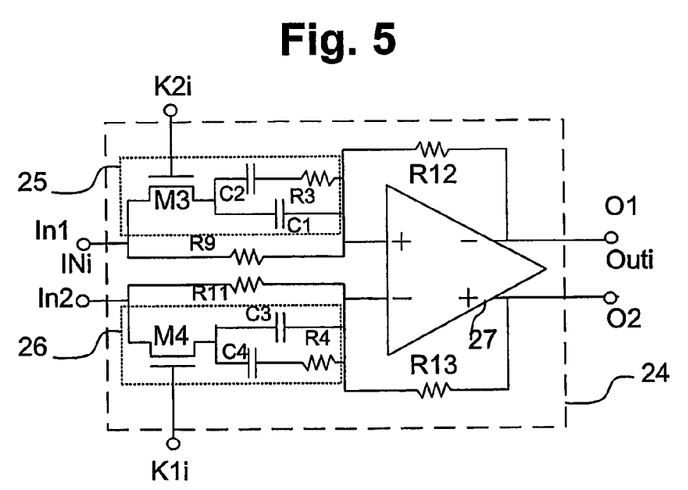
FIG. 5 shows a circuit diagram of an embodiment of an adaptive amplifying compensation stage based on an OPAMP having two tuning signals, whereby the tuning is obtained by two functions that generate asymmetry when one of both functions is ON and the other is OFF.

FIG. 5 shows an OPAMP alternative for OTA based LF amplification circuit LF1 that in some cases may be favoured by design engineers for designing an adaptive amplifying compensation stage 24. The compensation stage 24 of FIG. 5 comprises a first HF amplification means 25 and a second amplification means 26, which are as the first and second amplification means 10, 11 of FIG. 3a, and therefore are not explained in detail here again. The compensation stage 24 furthermore comprises an opamp 27 having a positive and a negative input terminal and a positive and a negative output terminal. The first HF amplification means 25 is coupled between a first input terminal In1 of the compensation stage 24 and the positive input terminal + of the opamp 27. A resistor R9 is also coupled between these input terminals In1, +, in parallel with the first HF amplification means 25. The second HF amplification means 26 is coupled between a second input terminal In2 of the compensation stage 24 and the negative input terminal of the opamp 27. A resistor R11 is also coupled between these input terminals In2, −, in parallel with the second HF amplification means 26. The negative output terminal of the opamp 27 is coupled to the first output terminal O1 of the compensation stage 24, and the positive output terminal of the opamp 27 is coupled to the second output terminal O2 of the compensation stage 24. A first feedback resistance R12 is coupled between the negative output terminal of opamp 27 and the positive input terminal thereof, and a second feedback resistance R13 is coupled between the positive output terminal of opamp 27 and the negative input terminal thereof.

In first instance, first HF amplification means 25 is turned ON, followed by second HF amplification means 26. When first HF amplification means 25 is ON and second HF amplification means 26 is still OFF, the differential transfer behaviour can still be perfect. However due to the induced asymmetric functioning of compensation stage 24, some unwanted common mode effects can be expected. However, each following differential stage will reject this common mode irregularity.

The lengths L of transistors M3 and M4 can be taken at the smallest length possible for the given technology. The widths W of transistors M3 and M4 should be taken large enough to be able to place the poles and zero's associated with the resistors R3, R4 and the capacitors C1 ... C4 on their intended position. It is however possible that transistors M3 and M7 cannot be designed to perform well enough. This would typically be the case when their parasitic capacitance starts having detrimental effect on the transfer function, even when the tuning signals K1$i$ and k2$i$ are fully in either of two binary states, e.g. are fully ONE or ZERO. In that case, another circuit topology needs to be found. One solution to this is for instance, instead of using transistors M3 and M4 for bringing in HF amplification means 25 and 26, the use of MOS varactors as variable capacitors at the place of capacitors C1 ... C4 (and the removal of transistors M3 and M4).

Figure 6:
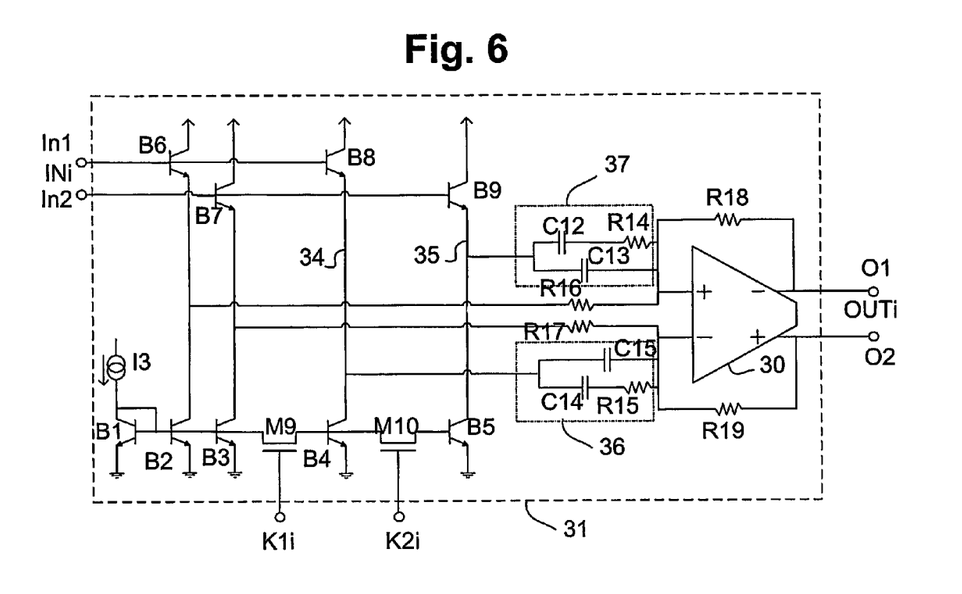
FIG. 6 shows a circuit diagram of an embodiment of an adaptive amplifying compensation stage having two tuning signals, whereby the tuning is achieved by sequentially turning ON and OFF two emitter followers.

Another solution is by using voltage followers, as in FIG. 6 where this is being demonstrated, as an example only, with Bipolar transistors.

FIG. 6 shows how in a BICMOS technology with weak performing CMOS transistors a similar principle like with the circuit of FIG. 5 can be achieved. Thereby, the higher speed bipolar transistors B1 ... B9 will form the fast part of the circuit. Transistors B13 ... B9, and the transistors in opamp 30 are e.g. all bipolar. The Compensation stage 31 comprises an opamp 30, a first HF amplification means 36 (comprising a resistor R14 and capacitors C12, C13) and a second HF amplification means 37 (comprising a resistor R15 and resistors C14, C15). First and second feedback resistors R18, R19 are coupled over the opamp 30 as in FIG. 5. Voltage followers B6 and B7, drive the input of the amplification stage, without generating higher frequency gain.

When current source B4 is turned ON (by first tuning signal K1$i$), voltage follower B8 will turn ON as well, and node 34 copies the input signal with a small voltage offset, and drives first HF amplification means 36, generating higher frequency gain. Similarly, current source B5 can be turned ON (by second tuning signal K2$i$), voltage follower B9 will then turn ON as well, and node 35 will drive second HF amplification means 37, thus further doubling the amount of higher frequency gain of the total stage.

Nowadays, bipolar equalizers are typically made using techniques very similar to the techniques used to make a Gilbert Multiplier, requiring a power supply voltage of essentially 3.3 volt. Using the principle of FIG. 6, the power supply voltage can be easily decreased to below 1800 mV, since the number of transistors that need to be vertically stacked—each requiring some voltage range of the power supply voltage—can be kept at low as two.

Figure 7:
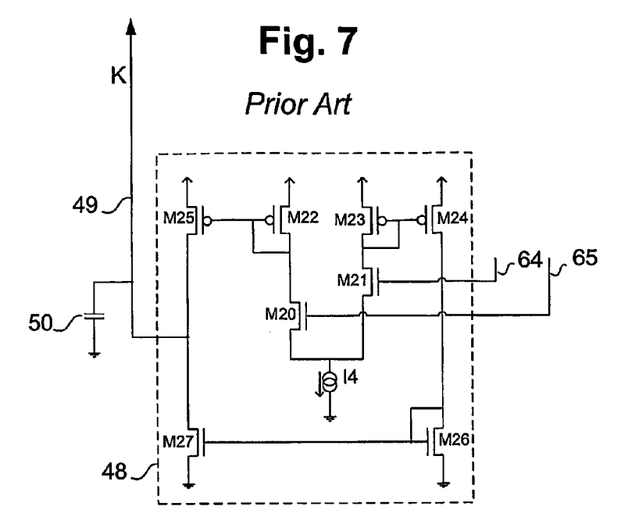
FIG. 7 illustrates a typical prior art symmetric OTA that generates tuning signal K in the case of a single amplifying stage with single tuning signal.

FIG. 7 shows how OTA 48 from FIG. 1 can be made by using a textbook symmetrical OTA that has full output range. The OTA 48 comprises transistors M20 ... M27 and current source 14 all connected up as known by a person skilled in the art and as represented in FIG. 7, and has as input signals the signals on nodes 64 and 65 coming from the peak detectors 46 and 47.

Figure 8:
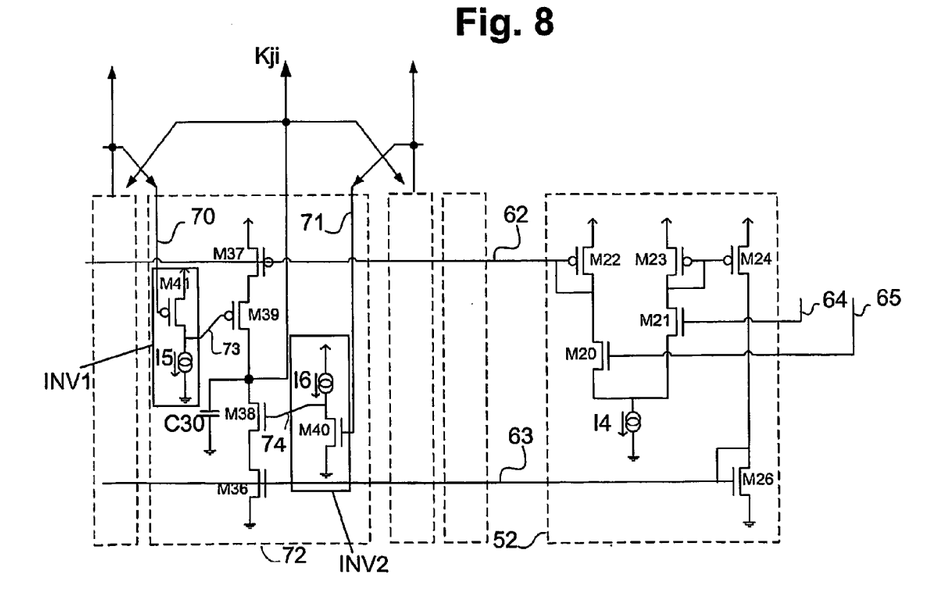
FIG. 8 illustrates an embodiment of a method for generating all the different tuning signals following the neighbour triggering method according to the present invention.

FIG. 8 shows a preferred embodiment of the present invention for gradually and sequentially turning ON and OFF a large number of tuning signals. It is based on the fact that each tuning circuit keeps in touch with it neighbours.

Basically, in OTA 52 the same transistor topology of OTA 48 is used, however its output transistors (M25 and M27 in FIG. 7) are repeated in each tuning circuit 72, by transistors M37 and M36. Instead of one memory element 50, e.g. a capacitor, that stores the tuning signal K, for each tuning circuit 72, one memory element 30, e.g. a capacitor, is provided for storing the tuning signal Kj$i$. Each tuning circuit 72 receives its neighbouring tuning signals, such that it can determine whether it is allowed to become the tuning signal that can be intermediate. If a tuning circuit 72 only has one neighbouring tuning circuit, it only receives one neighbouring tuning signal. When the tuning voltage left from tuning circuit 72 shows a voltage on node 70 close to Vcc, then through a first inverter circuit INV1 comprising transistor M41, node 73 will go LOW, and transistor M39 becomes conductive. The tuning signal Kj$i$ can now increase. Similarly, when the voltage on Kj$i$ is getting close to Vcc, then it becomes the next tuning circuit's turn to start changing. When Kj$i$ has been high for some time, and the tuning voltage at the compensation stage right from compensation stage 72 shows a voltage close to 0 volt on node 71, then the transistor M40 of a second inverter circuit INV2 stops conducting, node 74 becomes HIGH, and from then on its up to tuning circuit 72 to start discharging memory element C30, e.g. a capacitor, through transistors M36 and M38. When functioning inside a tuning-loop like in FIG. 2, the typical outcome will be that after some time, equilibrium is reached, and one tuning signal Kj$i$ will be somewhere at an intermediate level. The tuning signals outputted by the tuning circuits at its left will be at a HIGH level, and the tuning signals outputted by the tuning circuits at its right will be at the LOW level.

Current sources I5 and I6 of the inverter circuits INV1 and INV2 should be designed to give only limited current, such that the voltage turning point of the first inverter INV1 formed by transistor M41 and current source I5 is very close to Vcc and so that the voltage turning point of the second inverter INV2 formed by current source I6 and transistor M40 is close to GND voltage.

The above principle can be unlimitedly extended. Uncertainties on the offset voltages in transistors M38 ... M41 have only some influence on the voltage turning points, not hindering the good operation of the tuning circuit 72. Mismatches in offset voltage between transistors M36 and M26 can be recalculated to an effective input offset at the input of comparator 52. However, by having a high transconductance in transistors M20 and M21, and a much lower transconductance in transistors M26 and M36, the offset mismatch referred to the input can be dimmed to a great extend, as known by the person skilled in the art. A similar offset mismatch reduction strategy holds for the transistors M37, M22, M23 and M24.

Figure 9:
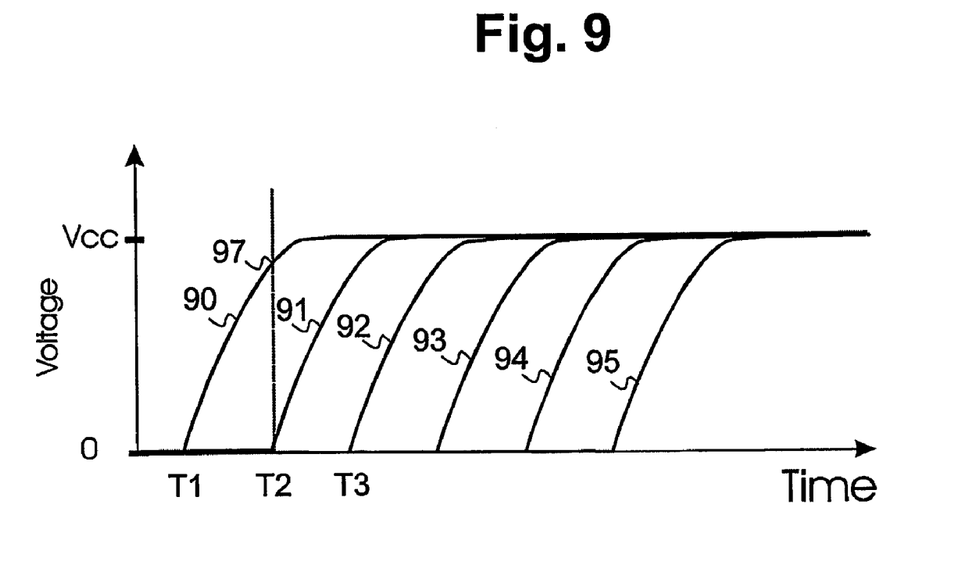
FIG. 9 shows a graph of voltage versus time, indicating how the different tuning signals turn to ON, when applying a step voltage at the input of the comparator of FIG. 2 and FIG. 8.

FIG. 9 further illustrates the neighbour triggered sequential principle. Curve 90 is a graph illustrating the first tuning signal K1*i* that increases, as from time T1, up to the power supply voltage. At moment T2, K1*i* reaches a voltage value close to Vcc, and node 73 of the next tuning circuit goes LOW. Curve 91, being the voltage of the next tuning signal starts increasing. When the latter voltage becomes high enough, at moment T3, the next tuning circuit starts becoming the tuning stage having an intermediate tuning signal voltage following curve 92. In this way sequential turn-ON is being established, further represented by curves 93, 94, 95. When the differential voltage at the input of comparator 52 changes sign, the complementary discharging process is started, as can be understood by a person skilled in the art.

The set of tuning signals that turn on sequentially, can be connected to the adaptive amplifying compensation stages freely. It is not necessary that the tuning signals follow the adaptive amplifying compensation stage in the same sequence, however to increase signal to noise ratio, it is better to start amplification (in this case of the higher frequencies), as soon as possible in the amplification chain. For that reason it is somewhat better to have the same sequence. For the adaptive amplifying compensation stages that have two or more tuning signals, especially when generating an asymmetry like aforementioned, it is advised to turn ON the tuning signals from each such stage successively.

The invention claimed is:

1. An adaptive equalizer having an adaptive filter, for at least partly compensating for frequency dependent signal modifications introduced by a transmission channel, said adaptive filter comprising a plurality of adaptive amplification compensation stages, each compensation stage being provided for receiving at least one tuning parameter, from a respective tuning circuit,
   wherein each the at least one tuning parameter received from the tuning circuit is such that it has one of a first binary value, a second binary value, or an intermediate value,
   a tuning parameter with a binary value generating a first signal filtering behavior and a tuning parameter with an intermediate value generating a second signal filtering behavior, the second signal filtering behavior being non-linear signal filtering behavior in that the quality of the filtering behavior depends on an amplitude of a signal input to each of the respective compensation stages;
   a control circuit for the tuning parameter comprising at least one port for receiving a first tuning parameter value and at least one port for outputting the tuning parameter value; a memory element for storing a value for the tuning parameter;
   and wherein said adaptive amplification compensation stage receiving said tuning parameter having an intermediate value, does not completely compensate for a signal loss of a portion of the transmission channel.

2. An adaptive equalizer according to claim 1, each of said compensation stages furthermore comprising at least one element, wherein by turning on said at least one element of at least one compensation stage a high frequency amplification means turns active in said at least one compensation stage.

3. An adaptive equalizer according to claim 2, wherein by partially turning on said at least one element in at least one compensation stage, said at least one compensation stage has a filtering behavior depending on the signal amplitude.

4. An adaptive equalizer according to claim 2, wherein said element is a transistor having a non-linear resistive value that is signal amplitude dependent leading to the non-linear filtering behavior.

5. An adaptive equalizer according to claim 2, wherein said element is a capacitor having a non-linear capacitor value, that is signal amplitude dependent, leading to the non-linear filtering behavior.

6. An adaptive equalizer according to claim 1, the at least partly compensating for frequency dependent signal modifications introduced by a transmission channel showing a filtering behavior which is at least partly the inverse functions of ideal transfer functions of the transmission channel, wherein said filtering behavior comprises at least 50% inverse functions of ideal transfer functions of the transmission channel, at least 66% inverse functions of ideal transfer functions of the transmission channel, or at least 75% inverse functions of ideal transfer functions of the transmission channel.

7. An adaptive equalizer according to claim 1, wherein two or more tuning parameters are provided per adaptive amplification compensation stage.

8. An adaptive equalizer according to claim 1, wherein the amount of compensation obtained by tuning one tuning parameter is limited to 8 dB.

9. An adaptive equalizer according to claim 1, wherein no two tuning parameters of the adaptive filter have an intermediate value at a same moment in time.

10. An adaptive equalizer according to claim 1, furthermore comprising a control circuit for controlling the tuning parameters.

11. An adaptive equalizer according to claim 10, wherein the control circuit comprises, for a tuning parameter, a memory element for storing a value for that tuning parameter.

12. An adaptive equalizer according to claim 11, wherein the memory element is a capacitive element.

13. An adaptive equalizer according to claim 11, wherein the control circuit comprises, for a tuning parameter, a determining means for determining whether it is allowed for the tuning parameter to become a tuning parameter with an intermediate value.

14. An adaptive equalizer according to claim 1, said adaptive equalizer able to operate at a voltage below 2000 mV.

15. A method for adaptively equalizing at least part of a distorted signal from a transmission channel, wherein the distorted signal is filtered in an adaptive filter comprising a plurality of adaptive amplification compensation stages, each compensation stage being provided for receiving at least one or more tuning parameter, the method comprising:
   driving the tuning parameters so as to have one of a first binary value, a second binary value or an intermediate value,
   a tuning parameter with a binary value generating a first signal filtering behavior and a tuning parameter with an intermediate value generating a second signal filtering behavior, said second filtering behavior being non-linear in that the quality of the filtering behavior depends on an amplitude of a signal input to each of the respective adaptive amplification compensation stages;
   controlling each of the adaptive amplification compensation stages with the at least one respective tuning parameter; and
   wherein an adaptive amplification compensation stage controlled by the tuning parameter having an intermediate value does not compensate completely for a signal modification of a corresponding portion of the distorted signal from a transmission channel.

16. A method according to claim 15, comprising controlling an adaptive amplification compensation stage with at least two tuning parameters.

17. A method according to claim 15, wherein no two tuning parameters of the adaptive filter are driven so as to have an intermediate value at a same moment in time.

18. A method according to claim 15, wherein driving one tuning parameter provides partial compensation limited to 8 dB.

19. A method according to claim 15, wherein an adaptive amplification compensation stage controlled by all tuning parameters having a first binary value, compensates substantially ideally for the signal modification of a portion of the transmission channel.

20. A method according to claim 15, wherein the not complete compensation is due to non-linear effects in the adaptive amplification compensation stage.

21. A method according to claim 15, wherein the not complete compensation is due to the presence of a maximum in a compensation transfer function of the adaptive amplification compensation stage, the maximum being below an upper data frequency of the signal.

22. A method according to claim 15, wherein the plurality of tuning parameters are sequentially applied to the adaptive filter.

23. A method according to claim 15, wherein said adaptive equalizer operates at a voltage below 2000 mV.

* * * * *